United States Patent
Sun et al.

(10) Patent No.: US 11,555,156 B2
(45) Date of Patent: Jan. 17, 2023

(54) INTEGRATED PROCESS WITH A DEASPHALTING COLUMN FOR CRUDE OIL DIRECT CATALYTIC UPGRADING

(71) Applicant: Saudi Arabian Oil Company, Dhahran (SA)

(72) Inventors: Miao Sun, Dhahran (SA); Zhonglin Zhang, Dhahran (SA); Sohel K. Shaikh, Dhahran (SA); Omer Koseoglu, Dhahran (SA)

(73) Assignee: Saudi Arabian Oil Company, Dhahan (SA)

( * ) Notice: Subject to any disclaimer, the term of this patent is extended or adjusted under 35 U.S.C. 154(b) by 0 days.

(21) Appl. No.: 17/683,513

(22) Filed: Mar. 1, 2022

(65) Prior Publication Data

US 2022/0275296 A1 Sep. 1, 2022

Related U.S. Application Data

(60) Provisional application No. 63/154,877, filed on Mar. 1, 2021.

(51) Int. Cl.
*C10G 69/06* (2006.01)

(52) U.S. Cl.
CPC ......... *C10G 69/06* (2013.01); *C10G 2400/02* (2013.01); *C10G 2400/30* (2013.01)

(58) Field of Classification Search
CPC ............... C10G 69/06; C10G 2400/02; C10G 2400/30; C10G 29/00; C10G 57/00;
(Continued)

(56) References Cited

U.S. PATENT DOCUMENTS 2,101,308 A 12/1937 Bray et al.
2,337,448 A 12/1943 Carr
(Continued)

FOREIGN PATENT DOCUMENTS

| CA | 2576950 A1 | 7/2003 | |
|---|---|---|---|
| WO | 2018094346 A1 | 5/2018 | |
| WO | WO-2018094346 A1 * | 5/2018 | ............. B01D 3/143 |

OTHER PUBLICATIONS

Notification of Transmittal of the International Search Report and the Written Opinion of the International Searching Authority, or the Declaration dated May 18, 2022 pertaining to International application No. PCT/US2022/018105 filed Feb. 28, 2022, pp. 1-12.

*Primary Examiner* — Randy Boyer
*Assistant Examiner* — Juan C Valencia
(74) *Attorney, Agent, or Firm* — Dinsmore & Shohl LLP

(57) ABSTRACT

A catalytic upgrading process includes introducing a feed comprising crude oil to a first catalytic deasphalting reactor to deasphalt the feed, thereby producing polymerized asphaltenes and deasphalted oil (DAO). The DAO is introduced to a steam cracking unit, thereby producing pyrolysis gas (PG), which is introduced into a selective hydrogenation unit, thereby producing an olefin-free product, which can then be introduced to a separation unit. The resulting benzene-toluene-xylenes (BTX)-containing stream and liquid petroleum gas (LPG) are separated, and the BTX-containing stream is introduced to a BTX complex to produce refined BTX. After deasphalting, a wash solvent may be introduced into the first catalytic deasphalting reactor to remove the polymerized asphaltenes, regenerate the catalyst, and produce a mixture comprising the wash solvent and the polymerized asphaltenes. The wash solvent is separated from the polymerized asphaltenes.

19 Claims, 3 Drawing Sheets

(58) Field of Classification Search
CPC ..... C10G 2400/28; B01J 38/50; B01J 27/188; B01J 27/19; B01J 27/285; B01J 38/48; B01J 38/56

See application file for complete search history.

(56) References Cited

U.S. PATENT DOCUMENTS

| | | |
|---|---|---|
| 2,367,671 A | 1/1945 | Dickinson et al. |
| 2,850,431 A | 9/1958 | Smith |
| 2,940,920 A | 6/1960 | Garwin |
| 3,159,571 A | 12/1964 | Reman et al. |
| 3,364,138 A | 1/1968 | Campagne et al. |
| 4,101,415 A | 7/1978 | Crowley |
| 4,290,880 A | 9/1981 | Leonard |
| 4,400,264 A | 8/1983 | Kwant et al. |
| 4,548,711 A | 10/1985 | Coombs et al. |
| 7,790,646 B2 | 9/2010 | Lopez et al. |
| 10,308,880 B2 * | 6/2019 | Sun ................. C10G 17/02 |
| 2013/0264247 A1 | 10/2013 | Cardenas et al. |
| 2019/0055476 A1 | 2/2019 | Sun et al. |
| 2020/0102507 A1 | 4/2020 | Sun et al. |

\* cited by examiner

INTEGRATED PROCESS WITH A DEASPHALTING COLUMN FOR CRUDE OIL DIRECT CATALYTIC UPGRADING

CROSS REFERENCE TO RELATED APPLICATION

This application claims priority to U.S. Patent Application Ser. No. 63/154,877, filed on Mar. 1, 2021, entitled "Integrated Process with a Deasphalting Column for Crude Oil Direct Catalytic Upgrading," the entire contents of which are incorporated by reference in the present disclosure.

FIELD

Embodiments of the present disclosure generally relate to refining hydrocarbon oil, and pertain particularly to a catalytic upgrading process for producing petrochemical substances from a crude oil stream while removing asphaltenes, the products comprising benzene-toluene-xylenes (BTX), liquid petroleum gas, and coke.

TECHNICAL BACKGROUND

Asphaltenes are the heaviest and most polar compounds naturally occurring in crude oil, which typically includes asphaltenes in concentrations ranging from 1% by weight to 17% by weight, and they are also identified as a major factor in causing difficulties during crude oil transportation and refining. Asphaltenes are one of the four main substances believed to be soluble in crude oils at atmospheric pressure and ambient temperature, the others being saturates, aromatics, and resins. However, unlike resins, asphaltenes contain highly polar species that tend to associate, and as a result, the interactions of asphaltenes with the environment are very complex.

Asphaltenes are a mixture of high molecular weight polycyclic aromatic hydrocarbons and heterocyclic compounds, primarily comprising carbon, hydrogen, nitrogen, oxygen, and sulfur, as well as trace amounts of vanadium and nickel. In asphaltenes, the hydrogen-to-carbon atomic ratio is approximately 1.2:1.0. Asphaltenes are defined operationally as n-pentane or n-heptane-insoluble, toluene-soluble components of a carbonaceous material such as crude oil, and are a sticky, black, highly viscous residue of distillation processes.

All aspects of crude oil production and refining may be negatively impacted by asphaltenes. For example, asphaltenes precipitation or deposition can occur in wellbores, pipelines, and surface facilities, limiting well productivity and fluid flow. Further, asphaltenes may poison the refining catalysts or may clog the refining system, causing damage and lost productivity for oil refineries.

Conventional asphaltenes separation, which may utilize Solvent Deasphalting (SDA) technology, involves applying paraffinic solvents (n-propane, n-butane, n-pentane, n-hexane, or n-heptane) to perform liquid-liquid extraction, to produce higher-value Deasphalted Oil (DAO). However, the SDA process requires a considerable amount of expensive paraffinic solvents (the solvent to crude oil ratio is typically from 2:1 to 10:1 by volume). Furthermore, the separation and recovery of paraffinic solvents from DAO are energy-intensive processes.

SUMMARY

There is a continual need for novel processes for removing asphaltenes from crude oil streams while converting the crude oil streams to valuable building block chemicals. Embodiments of the present disclosure are directed to a catalytic upgrading process focused on addressing this need.

According to an embodiment, a catalytic upgrading process for producing petrochemical substances from a crude oil stream includes a first catalytic deasphalting reactor upstream of a steam cracking unit. The first catalytic deasphalting reactor comprises a catalyst having a solid heteropolyacid compound. The process includes introducing a feed comprising crude oil to the first catalytic deasphalting reactor to deasphalt the feed, thereby producing polymerized asphaltenes and deasphalted oil having a reduced concentration of asphaltenes. The deasphalted oil may then be introduced to the steam cracking unit, thereby producing pyrolysis gasoline. This pyrolysis gasoline may then be introduced to a selective hydrogenation unit, thereby producing an olefin-free product, which may then be added to a separation unit. A BTX-containing stream and liquid petroleum gas may be obtained from the separation unit, which may then be separated from each other. The process further includes introducing the BTX-containing stream to a BTX complex, thereby producing refined BTX. A wash solvent may be introduced to the first catalytic deasphalting reactor after deasphalting to remove the polymerized asphaltenes, thereby regenerating the catalyst in the first catalytic deasphalting reactor and producing a mixture comprising the wash solvent and the polymerized asphaltenes. The wash solvent and polymerized asphaltenes may be separated from one another.

Additional features and advantages of the embodiments described herein will be set forth in the detailed description which follows, and in part will be readily apparent to those skilled in the art from that description or recognized by practicing the embodiments described, including the detailed description and the claims which are provided infra.

BRIEF DESCRIPTION OF THE DRAWINGS

The following detailed description of specific embodiments of the present disclosure can be best understood when read in conjunction with the following drawings in which.

DETAILED DESCRIPTION

Figure 1:
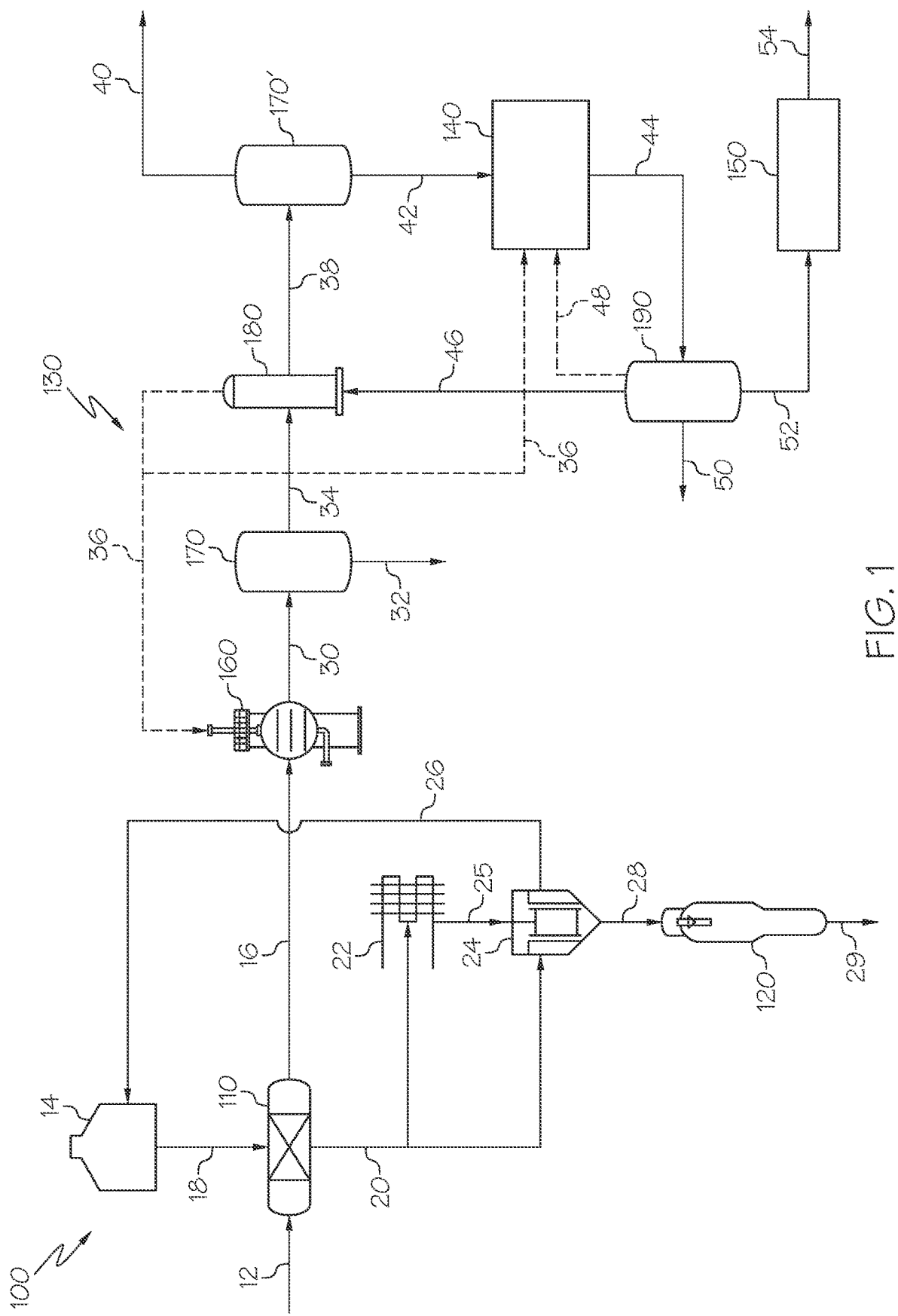
FIG. 1 depicts a catalytic upgrading process with in situ asphaltenes removal, in accordance with embodiments described herein.

As used herein, the term "hydrocarbon oil" or "hydrocarbon feedstock" refers to an oily liquid composed mostly of a mixture of hydrocarbon compounds. Hydrocarbon oil may include refined oil obtained from crude oil, synthetic crude oil, bitumen, oil sand, shale oil, or coal oil. The term "refined oil" includes, but is not limited to, vacuum gas oil (VGO), deasphalted oil (DAO) or demetallized oil (DMO) obtained from a deasphalting process, light and/or heavy coker gas oil obtained from a coking process, cycle oils obtained from an FCC process, and gas oil obtained from a visbreaking process.

As used herein, the term "hydrocarbon" refers to a chemical compound composed entirely of carbon and hydrogen atoms. An expression such as "$C_x$-$C_y$ hydrocarbon" refers to a hydrocarbon having from x to y carbon atoms. For instance, a $C_1$-$C_5$ hydrocarbon includes methane, ethane, propane, the butanes, and the pentanes.

As used herein, the term "hydrogen/oil ratio" or "hydrogen-to-oil ratio" or "hydrogen-to-hydrocarbon ratio" refers to a standard measure of the volume rate of hydrogen circulating through the reactor with respect to the volume of feed. The hydrogen/oil ratio may be determined by comparing the flow volume of the hydrogen gas stream and the flow volume of the hydrocarbon feed.

As used herein, the term "liquid hourly space velocity" or "LHSV" refers to the ratio of the liquid flow rate of the hydrocarbon feed to the catalyst volume.

As used herein, the term "conduit" includes casings, liners, pipes, tubes, coiled tubing, and mechanical structures with interior voids.

As used herein, the term "decreased content" of a substance means that a concentration of the substance is greater before passing through a stage of the process under examination than it is after passing through the stage. As used herein, the term "increased content" of a substance means that a concentration of the substance is greater after passing through a stage of the process under examination than it is before passing through the stage.

According to one aspect, a catalytic upgrading process for producing petrochemical substances from a crude oil stream includes introducing a feed comprising crude oil to a first catalytic deasphalting reactor to deasphalt the feed. The deasphalting produces polymerized asphaltenes and DAO having a reduced concentration of asphaltenes. These asphaltenes may be collected, and in embodiments, the asphaltenes thus collected may be heavier than those obtained from conventional solvent deasphalting units. The process also includes introducing the DAO to a steam cracking unit directly or hydroprocessing the DAO initially and then steam cracking the hydroprocessed DAO, which produces pyrolysis gasoline (PG) and fuel oil (FO). The PG may be introduced to a selective hydrogenation unit to hydrogenate di- and mono-olefins. The olefin-free product can be sent to an aromatic recovery unit to produce benzene-toluene-xylenes (BTX). The FO may be recycled back to the DAO hydroprocessing unit or sent to a stand-alone hydrocracking unit to hydrogenate and crack the multi-ring aromatics to produce a BTX-containing stream. Liquid petroleum gas (LPG) or other light gases may be recovered and sent to other process units, such as a steam cracking unit as a feedstock, to valorize the low value hydrocarbon streams. The BTX-containing stream may be introduced to a BTX complex to produce refined BTX. After deasphalting, a wash solvent may be introduced into the first catalytic deasphalting reactor to remove the polymerized asphaltenes, thereby regenerating the catalyst in the first catalytic deasphalting reactor and producing a mixture comprising the wash solvent and the polymerized asphaltenes. The wash solvent may be separated from the polymerized asphaltenes, which may be sent to a delayed coking unit to produce coke, sent to an asphalt pool, or sent to a gasification unit to produce syngas (CO and $H_2$).

In embodiments, the process includes introducing a feed comprising crude oil and non-paraffinic solvent to the first catalytic deasphalting reactor, resulting in DAO and polymerized asphaltenes. Non-paraffinic solvents include, but are not limited to, an aromatic hydrocarbon solvent, such as benzene, toluene, xylene, and mixtures thereof; an intermediate refinery stream, such as light cycle oil (LCO); aromatic recovery bottoms streams; and mixtures thereof. In embodiments, the aromatic recovery bottoms streams may include, for example, one or more $C_9$ and greater aromatic compounds, such as alkylated aromatics, monoaromatics, bridged aromatics, and condensed aromatics having two, three, or four aromatic rings. It is envisioned that one or more than one catalytic deasphalting reactor, such as a first catalytic deasphalting reactor and a second catalytic deasphalting reactor, may be used in the process. While the deasphalting is performed in the first catalytic deasphalting reactor (which is thus in the reaction mode), non-paraffinic solvent may be added to a second catalytic deasphalting reactor to regenerate the catalyst of the second catalytic deasphalting reactor (which is thus in the regeneration mode). The non-paraffinic solvent used for catalyst regeneration may be, but need not be, the same non-paraffinic solvent combined with the crude oil before introducing the mixture to the first catalytic deasphalting reactor. As used herein, "non-paraffinic solvent" and "wash solvent" are synonymous. After the catalyst of the second catalytic deasphalting reactor is regenerated by washing away the polymerized asphaltenes contained therein, the second catalytic deasphalting reactor may become the reactor used for deasphalting the crude oil stream and the catalyst of the first catalytic deasphalting reactor is regenerated by washing away the polymerized asphaltenes contained therein. Stated differently, after the catalyst of the second catalytic deasphalting reactor is regenerated, the first catalytic deasphalting reactor may be switched to regeneration mode and the second catalytic deasphalting reactor may be switched to reaction mode. This cycle of reaction mode and regeneration mode may be repeated continuously as necessary for processing a given quantity of crude oil.

When more than two catalytic deasphalting reactors are used, such as when three catalytic deasphalting reactors are used, any desired number of the catalytic deasphalting reactors may be in reaction mode and any desired number of the catalytic deasphalting reactors may be in regeneration mode. For example, when three catalytic deasphalting reactors are used, the crude oil feed may be introduced to the first and third catalytic deasphalting reactors for deasphalting while the non-paraffinic solvent without the crude oil feed may be added to the second catalytic deasphalting reactor for catalyst regeneration.

In embodiments, each catalytic deasphalting reactor may be charged with a catalyst composition having a solid heteropolyacid compound. In embodiments, the solid heteropolyacid compound may be selected from the group consisting of Keggin-type heteropolyacids, cesium substituted heteropolyacids, and combinations thereof. Exemplary Keggin-type heteropolyacids include, but are not limited to, phosphortungstic heteropolyacid ($H_3PW_{12}O_{40}$), phosphormolybdic heteropolyacid ($H_3PMo_{12}O_{40}$), silicotungstic heteropolyacid ($H_4SiW_{12}O_{40}$), silicomolybdic heteropolyacid ($H_4SiMo_{12}O_{40}$), and combinations thereof. Exemplary cesium substituted heteropolyacids include, but are not limited to, $Cs_xH_yPMo_{12}O_{40}$, where $0<x<4$ and y equals 3-x; $Cs_xH_yPW_{12}O_{40}$, where $0<x<4$ and y equals 4-x; $Cs_xH_ySiMo_{12}O_{40}$, where $0<x<4$ and y equals 3-x; $Cs_xH_ySiW_{12}O_{40}$, where $0<x<4$ and y equals 4-x; and combinations thereof. In embodiments, the active catalyst component may be mixed with a binder to form catalyst pellets, extrudates, spheres, or a combination of two or more thereof. In embodiments, the extrudates may be from particles having cylindrical shape, trilobe shape, quadralobe shape, spherical shape, or a combination of two or more thereof. In embodiments, the binder may be alumina, silica-alumina, titania, silica, or combination of two or more thereof. The catalyst composition may be in the form of particles having an average particle size from 1 mm to 5 mm, such as from 1.5 mm to 5 mm, from 2 mm to 5 mm, from 2.5 mm to 5 mm, from 3 mm to 5 mm, from 1 mm to 4.5 mm, from 1 mm to 4 mm, from 1 mm to 3.5 mm, or even from 1 mm to 3 mm.

In embodiments, each of the catalytic deasphalting reactors in reaction mode is heated at a temperature from 20° C. to 100° C., from 20° C. to 95° C., from 20° C. to 90° C., from 20° C. to 85° C., from 20° C. to 80° C., from 20° C. to 75° C., from 20° C. to 70° C., from 20° C. to 65° C., from 25° C. to 100° C., from 30° C. to 100° C., from 35° C. to 100° C., from 40° C. to 100° C., from 45° C. to 100° C., from 50° C. to 100° C., from 55° C. to 100° C., or even from 60° C. to 100° C. It should be understood that the temperature of the catalytic deasphalting reactor may be in a range formed from any of the lower bounds of such a temperature described herein to any of the upper bounds of such a temperature described herein.

In embodiments, the pressure within each of the catalytic deasphalting reactors may be above atmospheric in reaction mode as the reactor is heated toward the reaction temperature. For instance, the pressure may be from 0.1 MPa (1 bar) to 0.5 MPa (5 bar), from 0.1 MPa (1 bar) to 0.4 MPa (4 bar), from 0.1 MPa (1 bar) to 0.3 MPa (3 bar), from 0.1 MPa (1 bar) to 0.2 MPa (2 bar), from 0.2 MPa (2 bar) to 0.5 MPa (5 bar), from 0.3 MPa (3 bar) to 0.5 MPa (5 bar), or even from 0.4 MPa (4 bar) to 0.5 MPa (5 bar). It should be understood that the pressure within each of the catalytic deasphalting reactors in reaction mode may be in a range formed from any of the lower bounds of such a pressure described herein to any of the upper bounds of such a pressure described herein.

A mixture of wash solvent and polymerized asphaltenes is produced when the catalytic deasphalting reactor is in regeneration mode. This mixture may be passed to a separation system downstream of the catalytic deasphalting reactor(s) to separate the wash solvent from the polymerized asphaltenes. One non-limiting example of a separator is an evaporation system in which the wash solvent is evaporated, leaving a residue of polymerized asphaltenes. In embodiments, the evaporated wash solvent may be condensed by cooling the evaporated wash solvent. For instance, a cooler may be used to cool the evaporated wash solvent. The cooled wash solvent may then be recycled into the catalytic upgrading process. Other methods of separating the wash solvent from the polymerized asphaltenes are envisioned, and some of these other methods may not require the cooler for cooling the wash solvent. In embodiments, the process further includes heating the catalytic deasphalting reactor in the regeneration mode under a reduced pressure after introducing the wash solvent to remove at least 90% by weight of the wash solvent.

As a result of the catalytic upgrading process, the DAO has a reduced concentration of asphaltenes, such as less than 1% by weight asphaltenes. For example, the produced DAO may have a reduced concentration of asphaltenes of from 0.01% by weight to 0.5% by weight, from 0.01% to 0.4%, from 0.01% to 0.3%, from 0.01% to 0.2%, from 0.01% to 0.1%, from 0.02% to 0.4%, 0.03% to 0.4%, from 0.04% to 0.4%, from 0.05% to 0.4%, from 0.06% to 0.4%, 0.07% to 0.4%, from 0.08% to 0.4%, or even from 0.09% to 0.4%. It should be understood that the DAO may have a reduced concentration of asphaltenes in a range formed from any lower bound for such a range described herein to any upper bound for such a range described herein, including complete removal of asphaltenes (0% by weight of the DAO) and removal of all but a trace amount of asphaltenes. The DAO exiting the catalytic deasphalting process has a lower viscosity and lower content of heteroatoms and metals (e.g., S, N, Ni, and V) relative to the crude oil entering the catalytic deasphalting process.

The DAO is then introduced to a steam cracking unit, which may include a hydroprocessing unit, one or more separation zones, and a steam cracker. The hydroprocessing unit may include one or both of a hydrotreating reactor and a hydrocracking reactor. The resulting PG may then be deolefinated to produce an olefin-free BTX-rich stream in a selective hydrogenation unit. As used herein, the term "olefin-free BTX-rich stream" refers to a BTX-containing stream having less than 10 wt. % olefins, such as less than 9 wt. %, less than 8 wt. %, less than 7 wt. %, less than 6 wt. %, less than 5 wt. %, less than 4 wt. %, less than 3 wt. %, less than 2 wt. %, less than 1 wt. %, less than 0.5 wt. %, less than 0.1 wt. %, less than 0.01 wt. %, or even less than 0.001 wt. % olefins. A BTX Complex can then be used to further refine the olefin-free BTX-rich stream. Further details of the process described above will be provided with reference to the appended figures.

Referring now to FIG. 1, a process flow diagram of a catalytic upgrading process with in situ asphaltenes removal is shown. Apparatus 100 includes a catalytic deasphalting reactor 110, an asphalt disposal zone 120, a steam cracking unit 130, a selective hydrogenation unit 140, and a BTX complex 150.

In operation, a feed comprising crude oil is fed into catalytic deasphalting reactor 110 through conduit 12. Catalytic deasphalting reactor 110 may be in reaction mode or regeneration mode. In the reaction mode, the asphaltenes-containing crude oil is passed over a catalyst composition contained within the catalytic deasphalting reactor 110, resulting in DAO exiting the catalytic deasphalting reactor 110 through conduit 16 and polymerized asphaltenes within the catalytic deasphalting reactor 110. In the regeneration mode, wash solvent from solvent reservoir 14 without the asphaltenes-containing crude oil is added to the catalytic deasphalting reactor 110 through conduit 18 and allowed to flow through the catalytic deasphalting reactor 110 undergoing regeneration to produce a stream of solvent and polymerized asphaltenes, which passes through conduit 20 to exchanger 22 and flash vessel 24, either sequentially though conduit 25 or to each individually, to separate the solvent from the polymerized asphaltenes. The recovered solvent may be sent to the solvent reservoir 14 through conduit 26. The polymerized asphaltenes are sent to asphalt disposal zone 120 through conduit 28.

Figure 2:
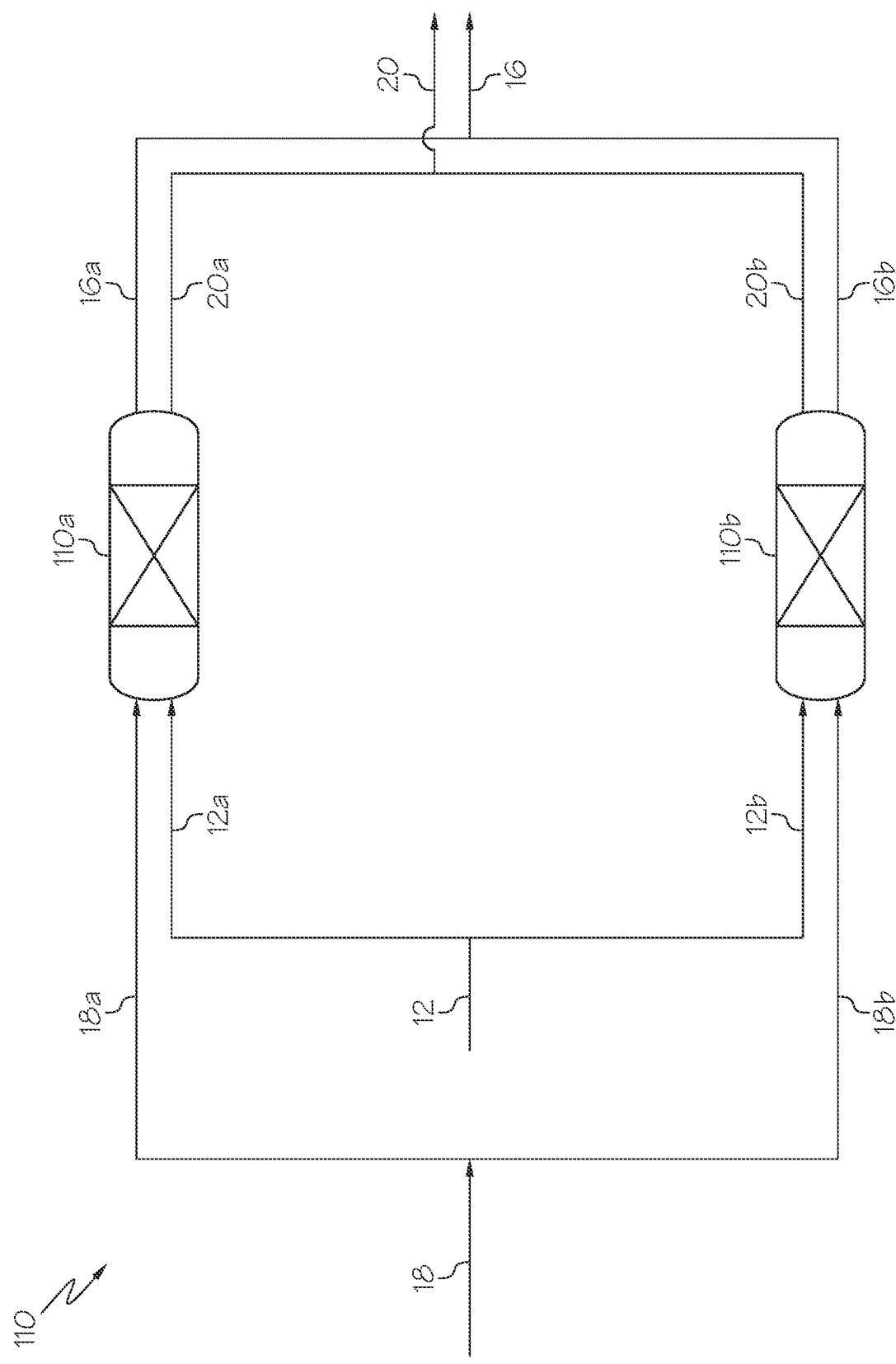
FIG. 2 is a schematic of a catalytic deasphalting reactor that includes two reactors according to embodiments described herein.

As shown in FIG. 2, the catalytic deasphalting reactor 110 may include a first catalytic deasphalting reactor 110a and a second catalytic deasphalting reactor 110b. Including at least two catalytic deasphalting reactors 110a, 110b allows for continuous operation of at least one catalytic deasphalting reactor, even when one catalytic deasphalting reactor must be shut down for catalyst regeneration, cleaning, or general maintenance. Conduit 12 may be split into two feed conduits 12a, 12b to feed each of the catalytic deasphalting reactors 110a, 110b, respectively. In the reaction mode, the asphaltenes-containing crude oil is passed over the catalyst composition contained within the reactor, resulting in DAO exiting at least one of the catalytic deasphalting reactors 110a, 110b through conduits 16a, 16b and polymerized asphaltenes within the catalytic deasphalting reactor 110a, 110b. In the regeneration mode, wash solvent from solvent reservoir 14 without the asphaltenes-containing crude oil is added to at least one of the catalytic deasphalting reactors 110a, 110b through conduit 18a, 18b and allowed to flow through the catalytic deasphalting reactor undergoing regeneration to produce a stream of solvent and polymerized asphaltenes. The stream of solvent and polymerized asphaltenes passes through conduit 20a, 20b to exchanger 22 and flash vessel 24, as shown in FIG. 1, to separate the solvent from the polymerized asphaltenes. The recovered solvent may be sent to the solvent reservoir 14 through conduit 26. As a result, the wash solvent may be recycled throughout the process. Recycling the wash solvent allows for a significant reduction in the amount of solvent used for the catalytic deasphalting process, providing a decreased cost and ecological benefit. The polymerized asphaltenes are sent to asphalt disposal zone 120 through conduit 28. The conduits 16a, 16b can be combined into the single conduit 16 to provide a single stream of the DAO. Similarly, the conduits 20a, 20b can be combined into the single conduit 20 to provide a single stream of the mixture of wash solvent and polymerized asphaltenes.

Figure 3:
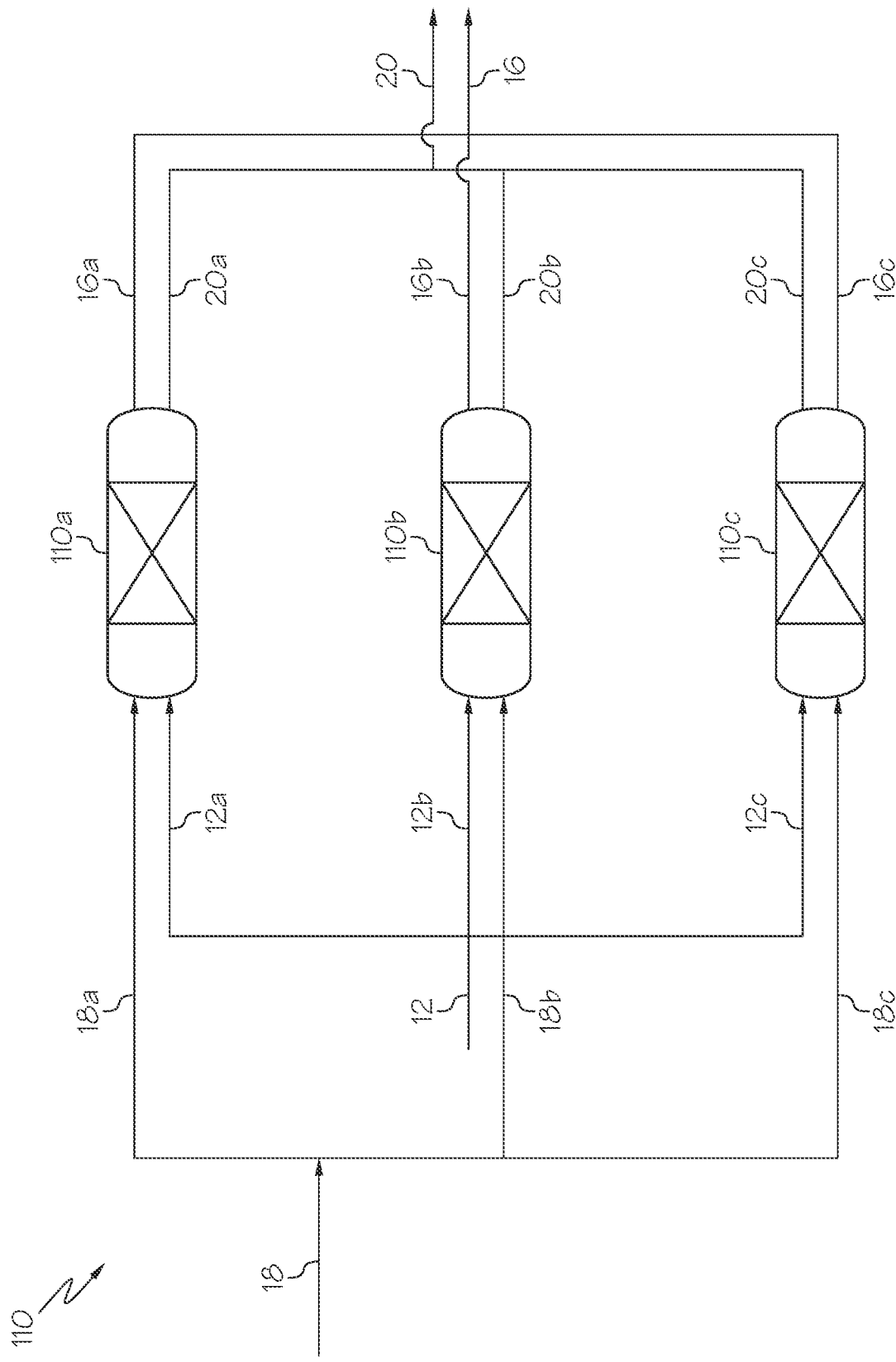
FIG. 3 is a schematic of a catalytic deasphalting reactor that includes three reactors according to embodiments described herein.

Referring now to FIG. 3, the catalytic deasphalting reactor 110 may include a first catalytic deasphalting reactor 110a, a second catalytic deasphalting reactor 110b, and a third catalytic deasphalting reactor 110c, the operation of which is similar to that of the catalytic deasphalting reactors shown in FIG. 2. Conduit 18, which provides wash solvent from solvent reservoir 14, may be divided into three parallel conduits 18a, 18b, 18c. Each of the parallel conduits 18a, 18b, 18c feeds an individual catalytic deasphalting reactor 110a, 110b, 110c. Similarly, conduit 12, which provides the crude oil to the catalytic deasphalting reactors 110a, 110b, 110c, may be divided into three parallel conduits 12a, 12b, 12c. Conduit 16, which allows the DAO to exit the catalytic deasphalting reactors 110a, 110b, 110c, may be divided into three parallel conduits 16a, 16b, 16c. Conduit 20, which allows the mixture of wash solvent and polymerized asphaltenes to exit the catalytic deasphalting reactors 110a, 110b, 110c, may be divided into three parallel conduits 20a, 20b, 20c, respectively. The conduits 16a, 16b, 16c can be combined into the single conduit 16 to provide a single stream of the DAO. Similarly, the conduits 20a, 20b, 20c can be combined into the single conduit 20 to provide a single stream of the mixture of wash solvent and polymerized asphaltenes.

Although embodiments having two and three catalytic deasphalting reactors 110 are shown in FIGS. 2 and 3, respectively, embodiments having additional catalytic deasphalting reactors 110 are envisioned. For instance, alternative embodiments may include four, five, six, seven, eight, nine, or even ten catalytic deasphalting reactors 110.

Referring again to FIG. 1, asphalt disposal zone 120 converts the asphaltenes to coke, which may be collected from conduit 29. As used herein, the term "coke" may refer to one or more of fuel coke, anode coke, and needle coke. The asphalt disposal zone 120 thermally cracks the polymerized asphaltenes into gases, such as $C_1$-$C_4$ hydrocarbons and $H_2S$; coker naphtha boiling in the range 36° C. to 180° C.; light coker gas oil boiling in the range 180° C. to 370° C.; and heavy coker gas oil boiling at and above 370° C.; with the residual excess carbon (such as micro carbon residue—MCR) becoming coke. An exemplary coke yield is 1 wt. % to 2 wt. % of the MCR content of the feedstock. This coke can then be used as an energy source or a carbon source to be used in the manufacture of various products, including synthesis gas, carbon steel, and aluminum carbide.

As noted above, the DAO exits that catalytic deasphalting reactor 110 through conduit 16, which feeds into the steam cracking unit 130. The steam cracking unit 130 may include various components, such as those shown in FIG. 1, i.e. the hydroprocessing reactor 160, one or more separation zones 170, 170', and steam cracker 180. In embodiments, the hydroprocessing reactor 160 may be a component of the steam cracking unit 130. In other embodiments, the hydroprocessing reactor 160 may be separate from the steam cracking unit 130.

Hydroprocessing reactor 160 removes nitrogen and sulfur and cracks heavy fractions from the DAO by hydrodenitrogenation, hydrodesulfurization, and hydrocracking conducted by passing the DAO over a bed of catalyst at an elevated temperature and elevated pressure. For instance, the catalyst may include a metal selected from cobalt, tungsten, nickel, molybdenum, or some combination of these, on a support, such as alumina or silica. As used in this context, an "elevated temperature" includes a temperature from 350° C. to 450° C., from 350° C. to 440° C., from 350° C. to 430° C., from 350° C. to 420° C., from 350° C. to 410° C., from 350° C. to 400° C., from 350° C. to 390° C., from 350° C. to 380° C., from 350° C. to 370° C., from 350° C. to 360° C., from 360° C. to 450° C., from 370° C. to 450° C., from 380° C. to 450° C., from 390° C. to 450° C., from 400° C. to 450° C., from 410° C. to 450° C., from 420° C. to 450° C., from 430° C. to 450° C., or even from 440° C. to 450° C. As used in this context, an "elevated pressure" includes a pressure from 1 MPa to 20 MPa, from 1 MPa to 19 MPa, from 1 MPa to 18 MPa, from 1 MPa to 17 MPa, from 1 MPa to 16 MPa, from 1 MPa to 15 MPa, from 1 MPa to 14 MPa, from 1 MPa to 13 MPa, from 1 MPa to 12 MPa, from 1 MPa to 11 MPa, from 1 MPa to 10 MPa, from 1 MPa to 9 MPa, from 1 MPa to 8 MPa, from 1 MPa to 7 MPa, from 1 MPa to 6 MPa, from 1 MPa to 5 MPa, from 1 MPa to 4 MPa, from 1 MPa to 3 MPa, from 1 MPa to 2 MPa, from 2 MPa to 20 MPa, from 3 MPa to 20 MPa, from 4 MPa to 20 MPa, from 5 MPa to 20 MPa, from 6 MPa to 20 MPa, from 7 MPa to 20 MPa, from 8 MPa to 20 MPa, from 9 MPa to 20 MPa, from 10 MPa to 20 MPa, from 11 MPa to 20 MPa, from 12 MPa to 20 MPa, from 13 MPa to 20 MPa, from 14 MPa to 20 MPa, from 15 MPa to 20 MPa, from 16 MPa to 20 MPa, from 17 MPa to 20 MPa, from 18 MPa to 20 MPa, or even from 19 MPa to 20 MPa. The LHSV within hydroprocessing reactor 160 may be from $0.1\ h^{-1}$ to $2\ h^{-1}$, from $0.1\ h^{-1}$ to $1.8\ h^{-1}$, from $0.1\ h^{-1}$ to $1.6\ h^{-1}$, from $0.1\ h^{-1}$ to $1.4\ h^{-1}$, from $0.1\ h^{-1}$ to $1.2\ h^{-1}$, from $0.1\ h^{-1}$ to $1\ h^{-1}$, from $0.1\ h^{-1}$ to $0.8\ h^{-1}$, from $0.1\ h^{-1}$ to $0.6\ h^{-1}$, from $0.1\ h^{-1}$ to $0.4\ h^{-1}$, from $0.1\ h^{-1}$ to $0.2\ h^{-1}$, from $0.2\ h^{-1}$ to $2\ h^{-1}$, from $0.4\ h^{-1}$ to $2\ h^{-1}$, from $0.6\ h^{-1}$ to $2\ h^{-1}$, from $0.8\ h^{-1}$ to $2\ h^{-1}$, from $1\ h^{-1}$ to $2\ h^{-1}$, from $1.2\ h^{-1}$ to $2\ h^{-1}$, from $1.4\ h^{-1}$ to $2\ h^{-1}$, from $1.6\ h^{-1}$ to $2\ h^{-1}$, or even from $1.8\ h^{-1}$ to $2\ h^{-1}$. Hydroprocessing reactor 160 may be fixed-bed, ebullated-bed, moving bed, slurry, or a combination of two or more of these.

Denitrogenated, desulfurized, and hydrocracked DAO exits the hydroprocessing reactor 160 and is passed to a first separation zone 170 via conduit 30. The first separation zone 170 removes the vacuum residue, which is collected from conduit 32, from the denitrogenated, desulfurized, and hydrocracked DAO, passing the denitrogenated, desulfurized, and hydrocracked DAO to the steam cracker 180 through conduit 34. In embodiments, the vacuum residue may be sent to the asphalt disposal zone 120. Gases including $C_1$-$C_4$ hydrocarbons may also be isolated in the first separation zone 170 and may be further processed in a refinery of a petrochemical complex.

Steam cracker 180 breaks down the denitrogenated, desulfurized, and hydrocracked DAO into light olefins, pyrolysis gas, pyrolysis gasoline, and pyrolysis fuel oil by thermally cracking the denitrogenated, desulfurized, and hydrocracked DAO using steam in steam cracking furnaces. Additionally, hydrogen gas may be produced during the steam cracking, and this hydrogen gas may be fed to one or both of the hydroprocessing reactor 160 and the selective hydrogenation unit 140 via conduit 36. As used herein, the term "pyrolysis gasoline" refers to $C_5$-$C_{13}$ hydrocarbons, and the term "pyrolysis fuel oil" refers to hydrocarbons with carbon number 12 and above and comprising a fused ring system having up to 10 rings. As used herein, the term "light olefins" refers to ethylene, propylene, and butylene.

The steam cracker 180 may contain multiple zones, such as a convection zone and a pyrolysis zone, and may be operated at an elevated temperature and elevated pressure, both of which may be the same or different in the multiple zones. As used in this context, an "elevated temperature" includes a temperature from 825° C. to 875° C., from 825° C. to 870° C., from 825° C. to 865° C., from 825° C. to 860° C., from 825° C. to 855° C., from 825° C. to 850° C., from 825° C. to 845° C., from 825° C. to 840° C., from 825° C. to 835° C., from 825° C. to 830° C., from 830° C. to 875° C., from 835° C. to 875° C., from 840° C. to 875° C., from 845° C. to 875° C., from 850° C. to 875° C., from 855° C. to 875° C., from 860° C. to 875° C., or even from 865° C. to 875° C. As used in this context, an "elevated pressure" includes a pressure from 100 kPa to 200 kPa, from 100 kPa to 190 kPa, from 100 kPa to 180 kPa, from 100 kPa to 170 kPa, from 100 kPa to 160 kPa, from 100 kPa to 150 kPa, from 100 kPa to 140 kPa, from 100 kPa to 130 kPa, from 100 kPa to 120 kPa, from 100 kPa to 110 kPa, from 110 kPa to 200 kPa, from 120 kPa to 200 kPa, from 130 kPa to 200 kPa, from 140 kPa to 200 kPa, from 150 kPa to 200 kPa, from 160 kPa to 200 kPa, from 170 kPa to 200 kPa, from 180 kPa to 200 kPa, or even from 190 kPa to 200 kPa. In embodiments, this elevated pressure is within the pyrolysis zone. The denitrogenated, desulfurized, and hydrocracked DAO may reside in each zone of the steam cracker 180 for a residence time from 0.05 s to 2 s, from 0.05 s to 1.9 s, from 0.05 s to 1.8 s, from 0.05 s to 1.7 s, from 0.05 s to 1.6 s, from 0.05 s to 1.5 s, from 0.05 s to 1.4 s, from 0.05 s to 1.3 s, from 0.05 s to 1.2 s, from 0.05 s to 1.1 s, from 0.05 s to 1 s, from 0.05 s to 0.9 s, from 0.05 s to 0.8 s, from 0.05 s to 0.7 s, from 0.05 s to 0.6 s, from 0.05 s to 0.5 s, from 0.05 s to 0.4 s, from 0.05 s to 0.3 s, from 0.05 s to 0.2 s, from 0.05 s to 0.1, from 0.1 s to 2 s, from 0.2 s to 2 s, from 0.3 s to 2 s, from 0.4 s to 2 s, from 0.5 s to 2 s, from 0.6 s to 2 s, from 0.7 s to 2 s, from 0.8 s to 2 s, from 0.9 s to 2 s, from 1 s to 2 s, from 1.1 s to 2 s, from 1.2 s to 2 s, from 1.3 s to 2 s, from 1.4 s to 2 s, from 1.5 s to 2 s, from 1.6 s to 2 s, from 1.7 s to 2 s, from 1.8 s to 2 s, or even from 1.9 s to 2 s.

Steam may be placed in contact with the denitrogenated, desulfurized, and hydrocracked DAO at a steam-to-hydrocarbon ratio (in Lt of steam per Lt of hydrocarbon) in one zone, such as the convection zone, from 0.3 to 2, from 0.3 to 1.9, from 0.3 to 1.8, from 0.3 to 1.7, from 0.3 to 1.6, from 0.3 to 1.5, from 0.3 to 1.4, from 0.3 to 1.3, from 0.3 to 1.2, from 0.3 to 1.1, from 0.3 to 1, from 0.3 to 0.9, from 0.3 to 0.8, from 1 to 2, from 1.1 to 2, from 1.2 to 2, from 1.3 to 2, from 1.4 to 2, or even from 1.5 to 2. In another zone, such as the pyrolysis zone, the steam-to-hydrocarbon ratio may be from 60 to 3000, from 60 to 2500, from 60 to 2000, from 60 to 1500, from 60 to 1000, from 60 to 900, from 60 to 800, from 60 to 700, from 60 to 600, from 60 to 500, from 60 to 400, from 60 to 300, from 60 to 200, from 500 to 3000, from 500 to 2500, from 500 to 2000, from 500 to 1500, from 500 to 1000, from 800 to 3000, from 800 to 2500, from 800 to 2000, from 800 to 1500, from 800 to 1000, from 1000 to 3000, from 1000 to 2500, from 1000 to 2000, or even from 1000 to 1500.

In embodiments, DAO bypasses the hydroprocessing reactor 160 and the first separation zone 170 and the liquid stream is passed directly to the steam cracker 180.

The heavy products of the steam cracking are then passed to separation zone 170' through conduit 38. As used herein, the term "heavy products" refers to $C_5$-$C_{12}$ hydrocarbons. Separation zone 170' is used to separate the lighter hydrocarbons, the pyrolysis gas and $C_5$-$C_9$ hydrocarbons, and the ELPG. The lighter hydrocarbons, pyrolysis gas, and $C_5$-$C_9$ hydrocarbons may all be collected via one or more conduits 40 for sale or further processing. The PG may be introduced to the selective hydrogenation unit 140 via conduit 42.

In the selective hydrogenation unit 140 the pyrolysis gasoline undergoes an olefin removal step. An additional reactor may be included to perform hydro-dealkylation and hydro-transalkylation, selectively opening aromatic rings and making BTX. Along with the BTX, the selective hydrogenation unit 140 also produces LPG and heavy aromatics. As used herein, the term "heavy aromatics" refers to aromatic hydrocarbons having nine or more carbon atoms in the aromatic system, such as eleven or more aromatic carbons, for instance. A separator 190, fed through conduit 44, may be used to separate the BTX, LPG, and heavy aromatics from one another. The LPG may be fed back to the steam cracker 180 via conduit 46 and the heavy aromatics may be recycled back to the selective hydrogenation unit 140 via conduit 48 or collected as fuel oil via conduit 50. The BTX may be sent to the BTX complex 150 via conduit 52 for further processing, producing refined BTX, which may be collected via conduit 54. An exemplary BTX complex 150 is described in U.S. Pat. No. 10,093,873, issued Oct. 9, 2018, the entire content of which is incorporated herein by reference.

According to an aspect, either alone or in combination with any other aspect, a catalytic upgrading process for producing petrochemical substances from a crude oil stream includes a first catalytic deasphalting reactor upstream of a steam cracking unit. The first catalytic deasphalting reactor comprises a catalyst having a solid heteropolyacid compound. The process includes introducing a feed comprising crude oil to the first catalytic deasphalting reactor to deasphalt the feed, thereby producing polymerized asphaltenes and deasphalted oil having a reduced concentration of asphaltenes. The deasphalted oil may then be introduced to the steam cracking unit, thereby producing pyrolysis gasoline. This pyrolysis gasoline may then be introduced to a selective hydrogenation unit, thereby producing an olefin-free product, which may then be added to a separation unit. A BTX-containing stream and liquid petroleum gas may be obtained from the separation unit, which may then be separated from each other. The process further includes introducing the BTX-containing stream to a BTX complex, thereby producing refined BTX. A wash solvent may be introduced to the first catalytic deasphalting reactor after deasphalting to remove the polymerized asphaltenes, thereby regenerating the catalyst in the first catalytic deasphalting reactor and producing a mixture comprising the wash solvent and the polymerized asphaltenes. The wash solvent and polymerized asphaltenes may be separated from one another.

According to a second aspect, either alone or in combination with any other aspect, the first catalytic deasphalting reactor is heated from 20° C. to 100° C. when introducing the feed comprising crude oil.

According to a third aspect, either alone or in combination with any other aspect, the reduced concentration of asphaltenes in the deasphalted oil is less than 1% by weight based on the deasphalted oil.

According to a fourth aspect, either alone or in combination with any other aspect, the reduced concentration of asphaltenes in the deasphalted oil is from 0.01% by weight of the oil feed to 0.5% by weight based on the deasphalted oil.

According to a fifth aspect, either alone or in combination with any other aspect, the wash solvent is a non-paraffinic solvent.

According to a sixth aspect, either alone or in combination with any other aspect, the wash solvent comprises an aromatic hydrocarbon solvent.

According to a seventh aspect, either alone or in combination with any other aspect, the wash solvent is selected from the group consisting of benzene, toluene, xylene, an intermediate refinery stream, an aromatic recovery bottoms stream, and a mixture of two or more thereof.

According to an eighth aspect, either alone or in combination with any other aspect, the process further includes heating the first catalytic deasphalting reactor under a reduced pressure after introducing the wash solvent to the first catalytic deasphalting reactor to remove at least 90% by weight of the wash solvent.

According to a ninth aspect, either alone or in combination with any other aspect, the process further includes a second catalytic deasphalting reactor arranged in parallel with the first catalytic deasphalting reactor and comprising a catalyst having a solid heteropolyacid compound. The feed comprising crude oil may be introduced to the second catalytic deasphalting reactor to deasphalt the feed, thereby producing polymerized asphaltenes adsorbed to the catalyst and deasphalted oil having a reduced concentration of asphaltenes. The wash solvent may be introduced to the second catalytic deasphalting reactor after deasphalting to remove the polymerized asphaltenes, thereby regenerating the catalyst in the second catalytic deasphalting reactor and producing a mixture comprising the wash solvent and the polymerized asphaltenes.

According to a tenth aspect, either alone or in combination with any other aspect, introducing the feed comprising crude oil to the second catalytic deasphalting reactor occurs simultaneously with introducing the wash solvent to the first catalytic deasphalting reactor.

According to an eleventh aspect, either alone or in combination with any other aspect, the process further includes a third catalytic deasphalting reactor in parallel with the first and second catalytic deasphalting reactors and comprising a catalyst having a solid heteropolyacid compound.

According to a twelfth aspect, either alone or in combination with any other aspect, the feed comprising crude oil is introduced to the first and third catalytic deasphalting reactors for deasphalting simultaneously with introducing wash solvent to the second catalytic deasphalting reactor.

According to a thirteenth aspect, either alone or in combination with any other aspect, the solid heteropolyacid compound is selected from the group consisting of Keggin-type heteropolyacids, cesium substituted heteropolyacids, and combinations thereof.

According to a fourteenth aspect, either alone or in combination with any other aspect, the catalyst comprises at least one Keggin-type heteropolyacid selected from the group consisting of phosphortungstic heteropolyacid ($H_3PW_{12}O_{40}$), phosphormolybdic heteropolyacid ($H_3PMo_{12}O_{40}$), silicotungstic heteropolyacid ($H_4SiW_{12}O_{40}$), silicomolybdic heteropolyacid ($H_4SiMo_{12}O_{40}$), and combinations thereof.

According to a fifteenth aspect, either alone or in combination with any other aspect, the catalyst comprises at least one cesium substituted heteropolyacid selected from the group consisting of $Cs_xH_yPMo_{12}O_{40}$, where 0<x<4 and y equals 3-x; $Cs_xH_yPW_{12}O_{40}$, where 0<x<4 and y equals 4-x; $Cs_xH_ySiMo_{12}O_{40}$, where 0<x<4 and y equals 3-x; $Cs_xH_ySiW_{12}O_{40}$, where 0<x<4 and y equals 4-x; and combinations thereof.

According to a sixteenth aspect, either alone or in combination with any other aspect, the process further includes switching operational modes in the first catalytic deasphalting reactor such that the first catalytic deasphalting reactor is changed to perform catalyst regeneration.

According to a seventeenth aspect, either alone or in combination with any other aspect, the process further includes a control system which triggers the change in operational modes in the first catalytic deasphalting reactor when a level of catalyst deactivation in the first catalytic deasphalting reactor exceeds an acceptable level of catalyst deactivation.

According to an eighteenth aspect, either alone or in combination with any other aspect, the process further includes switching operational modes in the second catalytic deasphalting reactor such that the second catalytic deasphalting reactor is changed to perform deasphalting.

According to a nineteenth aspect, either alone or in combination with any other aspect, the process further includes introducing the polymerized asphaltenes to a delayed coking unit, the delayed coking producing coke, introducing the polymerized asphaltenes to an asphalt pool, or introducing the polymerized asphaltenes to a gasification unit, the gasification producing syngas.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

The invention claimed is:

1. A catalytic upgrading process for producing petrochemical substances from a crude oil stream, wherein the process comprises a first catalytic deasphalting reactor upstream of a steam cracking unit, wherein the first catalytic deasphalting reactor comprises a catalyst having a solid heteropolyacid compound, and wherein the process comprises:
    introducing a feed comprising crude oil to the first catalytic deasphalting reactor to deasphalt the feed, wherein the deasphalting produces polymerized asphaltenes and deasphalted oil having a reduced concentration of asphaltenes;
    introducing the deasphalted oil to the steam cracking unit, wherein the steam cracking produces pyrolysis gasoline;
    introducing the pyrolysis gasoline to a selective hydrogenation unit, wherein the selective hydrogenation produces an olefin-free product;
    introducing the olefin free product to a separation unit, thereby obtaining a benzene-toluene-xylenes (BTX)-containing stream and liquid petroleum gas;
    separating the BTX-containing stream from the liquid petroleum gas;
    introducing the BTX-containing stream to a BTX complex, wherein the BTX complex produces refined BTX;
    introducing a wash solvent to the first catalytic deasphalting reactor after deasphalting to remove the polymerized asphaltenes, thereby regenerating the catalyst in the first catalytic deasphalting reactor and producing a mixture comprising the wash solvent and the polymerized asphaltenes; and
    separating the wash solvent from the polymerized asphaltenes.

2. The process of claim 1, wherein the first catalytic deasphalting reactor is heated from 20° C. to 100° C. when introducing the feed comprising crude oil.

3. The process of claim 1, wherein the reduced concentration of asphaltenes in the deasphalted oil is less than 1% by weight based on the deasphalted oil.

4. The process of claim 3, wherein the reduced concentration of asphaltenes in the deasphalted oil is from 0.01% by weight of the oil feed to 0.5% by weight based on the deasphalted oil.

5. The process of claim 1, wherein the wash solvent is a non-paraffinic solvent.

6. The process of claim 1, wherein the wash solvent comprises an aromatic hydrocarbon solvent.

7. The process of claim 1, wherein the wash solvent is selected from the group consisting of benzene, toluene, xylene, an intermediate refinery stream, an aromatic recovery bottoms stream, and a mixture of two or more thereof.

8. The process of claim 1, further comprising heating the first catalytic deasphalting reactor under a reduced pressure after introducing the wash solvent to the first catalytic deasphalting reactor to remove at least 90% by weight of the wash solvent.

9. The process of claim 1, further comprising a second catalytic deasphalting reactor arranged in parallel with the first catalytic deasphalting reactor and comprising a catalyst having a solid heteropolyacid compound, the process further comprising:
    introducing the feed comprising crude oil to the second catalytic deasphalting reactor to deasphalt the feed, wherein the deasphalting produces polymerized asphaltenes adsorbed to the catalyst and deasphalted oil having a reduced concentration of asphaltenes; and
    introducing the wash solvent to the second catalytic deasphalting reactor after deasphalting to remove the polymerized asphaltenes, thereby regenerating the catalyst in the second catalytic deasphalting reactor and producing a mixture comprising the wash solvent and the polymerized asphaltenes.

10. The process of claim 9, wherein introducing the feed comprising crude oil to the second catalytic deasphalting reactor occurs simultaneously with introducing the wash solvent to the first catalytic deasphalting reactor.

11. The process of claim 9, further comprising a third catalytic deasphalting reactor in parallel with the first and second catalytic deasphalting reactors and comprising a catalyst having a solid heteropolyacid compound.

12. The process of claim 11, wherein the feed comprising crude oil is introduced to the first and third catalytic deasphalting reactors for deasphalting simultaneously with introducing wash solvent to the second catalytic deasphalting reactor.

13. The process of claim 12, wherein the solid heteropolyacid compound is selected from the group consisting of Keggin-type heteropolyacids, cesium substituted heteropolyacids, and combinations thereof.

14. The process of claim 13, wherein the catalyst comprises at least one Keggin-type heteropolyacid selected from the group consisting of phosphotungstic heteropolyacid ($H_3PW_{12}O_{40}$), phosphomolybdic heteropolyacid ($H_3PMo12040$), silicotungstic heteropolyacid ($H_4SiWI2040$), silicomolybdic heteropolyacid ($H_4SiMo1204_0$), and combinations thereof.

15. The process of claim 13, wherein the catalyst comprises at least one cesium substituted heteropolyacid selected from the group consisting of $Cs_xH_yPMo_{12}O_{40}$, where $0<x<4$ and y equals 3-x; $Cs_xH_yPW_{12}O_{40}$, where $0<x<4$ and y equals 4-x; $Cs_xH_ySiMo_{12}O_{40}$, where $0<x<4$ and y equals 3-x; $Cs_xH_ySiW_{12}O_{40}$, where $0<x<4$ and y equals 4-x; and combinations thereof.

16. The process of claim 1, further comprising switching operational modes in the first catalytic deasphalting reactor such that the first catalytic deasphalting reactor is changed to perform catalyst regeneration.

17. The process of claim 16, further comprising a control system which triggers the change in operational modes in the first catalytic deasphalting reactor when a level of catalyst deactivation in the first catalytic deasphalting reactor exceeds an acceptable level of catalyst deactivation.

18. The process of claim 9, further comprising switching operational modes in the second catalytic deasphalting reactor such that the second catalytic deasphalting reactor is changed to perform deasphalting.

19. The process of claim 1, further comprising introducing the polymerized asphaltenes to a delayed coking unit, the delayed coking producing coke, introducing the polymerized asphaltenes to an asphalt pool, or introducing the polymerized asphaltenes to a gasification unit, the gasification producing syngas.

\* \* \* \* \*